United States Patent
Bowman et al.

(10) Patent No.: US 6,828,918 B2
(45) Date of Patent: Dec. 7, 2004

(54) PERSONALIZED ACCESSIBILITY IDENTIFICATION RECEIVER/ TRANSMITTER AND METHOD FOR PROVIDING ASSISTANCE

(75) Inventors: James Patrick Bowman, Austin, TX (US); Herman Rodriquez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 09/725,349

(22) Filed: Nov. 29, 2000

(65) Prior Publication Data

US 2002/0063632 A1 May 30, 2002

(51) Int. Cl.[7] .......................... G08G 1/095; G08G 1/07
(52) U.S. Cl. .................. 340/825.19; 340/944; 340/925
(58) Field of Search ............................ 340/825.19, 7.23, 340/944, 925; 187/391; 704/271; 345/865; 235/375; 436/128; 473/56

(56) References Cited

U.S. PATENT DOCUMENTS

| | | | |
|---|---|---|---|
| 4,212,116 A | | 7/1980 | Hajduch ..................... 35/29 R |
| 4,297,677 A | | 10/1981 | Lewis et al. ................ 340/148 |
| 4,334,280 A | | 6/1982 | McDonald .................. 364/710 |
| 4,380,759 A | | 4/1983 | Sulkoski et al. ............ 340/407 |
| 4,655,324 A | * | 4/1987 | Meguerdichian et al. ... 187/380 |
| 4,665,385 A | * | 5/1987 | Henderson .................. 340/539 |
| 4,777,474 A | | 10/1988 | Clayton ...................... 340/539 |
| 4,842,607 A | | 6/1989 | Repperger et al. ............ 623/24 |
| 4,853,674 A | | 8/1989 | Kiss ............................ 340/407 |
| 5,012,226 A | | 4/1991 | Love ........................... 340/576 |
| 5,233,662 A | | 8/1993 | Christensen ................. 387/70 |
| 5,260,869 A | | 11/1993 | Ferrier et al. ........... 364/413.01 |
| 5,351,288 A | | 9/1994 | Engelke et al. ............... 379/98 |
| 5,589,855 A | | 12/1996 | Blumstein et al. .......... 345/173 |
| 5,736,692 A | * | 4/1998 | Lumme et al. ............. 187/247 |
| 5,749,443 A | * | 5/1998 | Romao ....................... 187/384 |
| 5,767,842 A | | 6/1998 | Korth ......................... 345/168 |
| 5,806,017 A | | 9/1998 | Hancock ..................... 701/209 |
| 5,867,105 A | | 2/1999 | Hajel ....................... 340/691.3 |
| 5,917,174 A | | 6/1999 | Moore et al. .......... 235/462.44 |
| 6,152,265 A | * | 11/2000 | Bittar et al. ................. 187/384 |
| 6,240,392 B1 | * | 5/2001 | Butnaru et al. ............. 704/271 |
| 6,446,761 B1 | * | 9/2002 | Motoyama et al. ......... 187/391 |

FOREIGN PATENT DOCUMENTS

DE      4340811    *   6/1995      ............ G08G/1/07

* cited by examiner

*Primary Examiner*—Michael Horabik
*Assistant Examiner*—Nam V Nguyen
(74) *Attorney, Agent, or Firm*—Duke W. Yee; Jeffrey S. Labaw; Francis Lammes

(57) ABSTRACT

An impaired person is provided with a personalized accessibility device, which communicates an identification of a disability or impairment to an assistance device, which provides assistance. Also provided is a method and apparatus for providing feedback to a person with impairment. The feedback may be configured based on the type and extent of impairment, as well as personal preferences, such as a preferred language. The assistance device may also request a response from the disabled or impaired person, thus solving the person's Special Needs in a conversational manner without calling attention to the impairment.

47 Claims, 7 Drawing Sheets

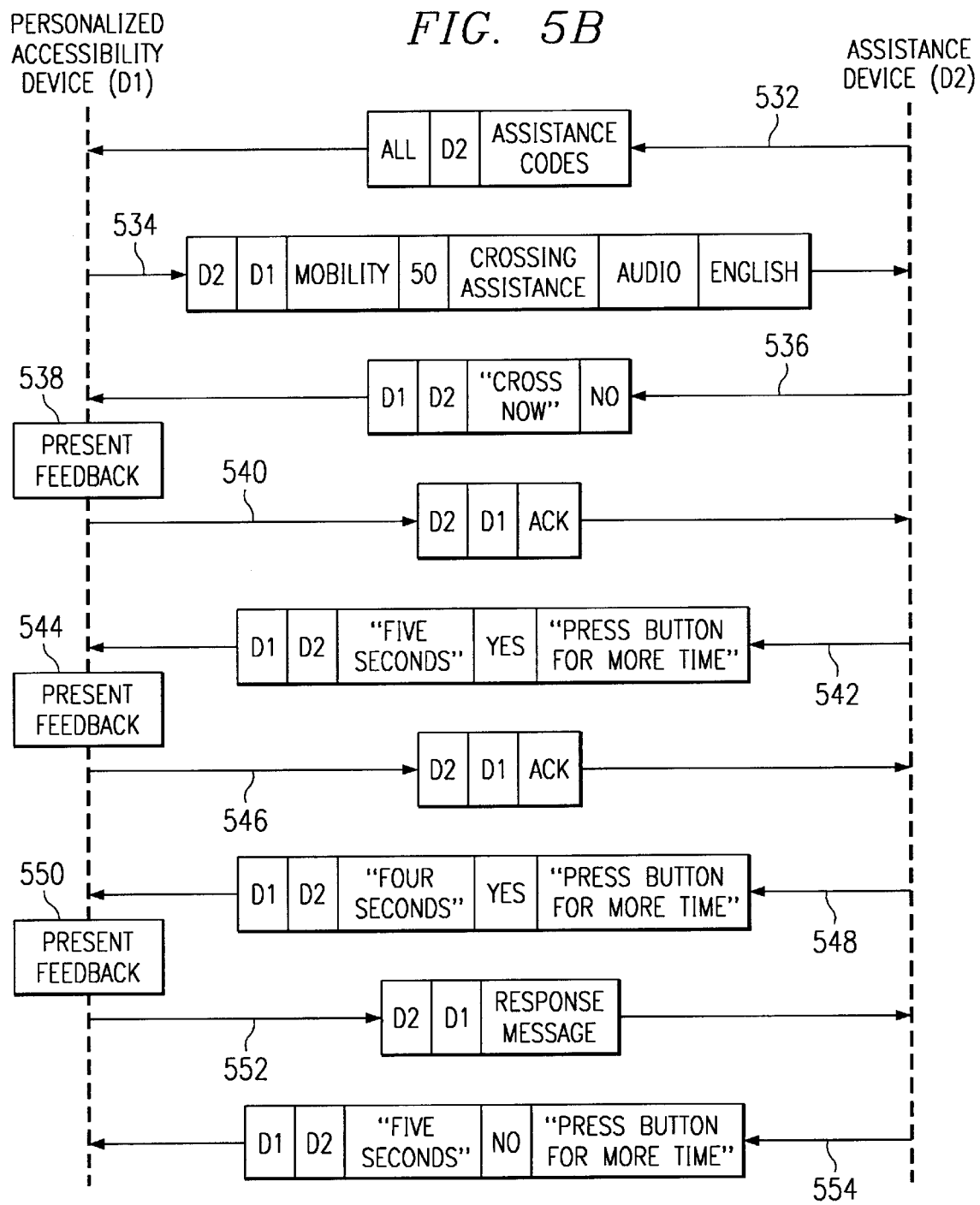

PERSONALIZED ACCESSIBILITY IDENTIFICATION RECEIVER/ TRANSMITTER AND METHOD FOR PROVIDING ASSISTANCE

BACKGROUND OF THE INVENTION

1. Technical Field

The present invention relates to an assistance device and personal accessibility device. More particularly, the present invention provides a method and apparatus for providing assistance to a person with Special Needs.

2. Description of Related Art

People with Special Needs often have to take extra steps to enable accessibility assistance from devices. These steps can be time consuming and awkward. At times, these actions can even be frustrating or embarrassing, since the person with the Special Needs call attention to the fact that they have an impairment by taking some special action to enable the accessibility assistance. For example, a mobility-impaired person, such as a person confined to a wheelchair, may need to call out for someone on an elevator to hold the door open. If nobody is on the elevator, the mobility-impaired person may still miss the elevator, despite calling attention to the impairment.

Prior art devices may provide assistance for impaired persons. For example, an alarm system may provide additional assistance, such as a flashing light, to a hearing-impaired person. However, such solutions are usually impairment specific and may still require an action by the impaired person. Furthermore, the assistance is not tailored to the extent of the impairment or other Special Needs.

Therefore, it would be advantageous to provide a method and apparatus for identifying an impairment, extent of the impairment, and preferences of the impaired person and for providing assistance and feedback based on the impairment, extent of the impairment, and preferences.

SUMMARY OF THE INVENTION

The present invention solves the disadvantages of the prior art by providing the impaired person with a personalized accessibility device, which receives signals from assistance devices in the area and transmits a signal that identifies the type of special need the person has. Assistance devices are then configured to provide assistance based upon the special need and preferences of the person. Assistances devices are also configured to provide feedback to the person through the personalized accessibility device. This feedback may be generated based upon the special need of the person, as well as preferences of the impaired person.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A, 5B, 5C, and 5D are data flow diagrams illustrating exemplary implementations of the present invention;

DETAILED DESCRIPTION OF THE PREFERRED EMBODIMENT

Figure 1:
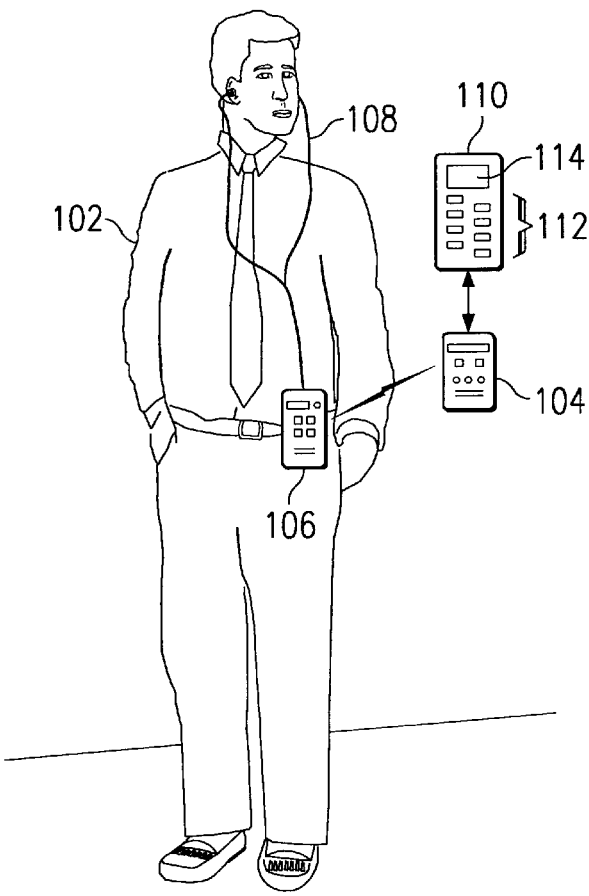
FIG. 1 is a pictorial representation of an assistance device and a personalized accessibility device in accordance with a preferred embodiment of the present invention.

With reference now to the figures and in particular with reference to FIG. 1, a pictorial representation of an assistance device and a personalized accessibility device is depicted in accordance with a preferred embodiment of the present invention. An impaired person 102 must interface with a device 110. In the example shown in FIG. 1, device 110 is an elevator controller and interface including control buttons 112 and display 114. The elevator controller allows a passenger to request an elevator, to open and close the elevator doors, and to specify a floor on which the elevator is to stop via buttons 112. The controller provides feedback to the passenger via display 114. The feedback includes an indication of the floor on which the elevator is currently located, but may include other information, such as operational status information or advertisements.

Person 102 may have an impairment, which prevents the person from effectively interfacing with device 110. For example, the person may be mobility-impaired, making it difficult to enter or exit the elevator during the default time during which the elevator doors remain open. In such a situation, the impaired person must request assistance from other passengers to hold the doors open for an extended period. However, such an action calls attention to the impairment. Furthermore, if there are no other passengers, the person may miss the elevator altogether. This is often a source of frustration and embarrassment for the impaired person.

According to a preferred embodiment of the present invention, device 110 is connected to assistance device (AD) 104. The assistance device periodically transmits a assistance data packet, which identifies the types of assistance provided by the assistance device. Person 102 carries a personalized accessibility device (PAD) 106, which receives assistance data packets and, if an assistance data packet identifies a needed type of assistance, responds with a Special Needs data packet via wireless means, such as radio frequency (RF) transmission. The Special Needs data packet may include information, such as the impairment of the person, the extent of the impairment, and personal preferences of the impaired person. Assistance device 104 receives the Special Needs data packet and instructs device 110 to provide assistance. In the above example, the mobility-impaired person carries a personalized accessibility device, which transmits a Special Needs data packet indicating mobility impairment, the extent of the impairment, and preferences of the impaired person. Assistance device 104 may receive the Special Needs data packet and, based on the mobility impairment, instruct controller 110 to hold the elevator doors open for an extended period of time. The amount of time the period is extended may be determined in response to the extent of the impairment.

Furthermore, in accordance with a preferred embodiment of the present invention, assistance device 104 may transmit feedback to personalized accessibility device 106 for presentation to person 102 via output device 108. In the above example, the feedback may be a countdown of the time remaining before the elevator doors close. Output device 108 may be headphones and PAD 106 may present the feedback as audio output. Thus, the impaired person may receive feedback without calling attention to the impairment. The output device may also be other means for presenting the feedback. For example, the output device may be a display for presenting text or graphics to a hearing-impaired person.

Still further, the feedback may be customized based on the preferences in the Special Needs data packet. For example, the person may configure a language preference in the personalized accessibility device. Thus, the assistance device may provide feedback to the personalized accessibility device in Spanish in response to the language preference.

As a further example, person 102 may have a visual impairment. In such a situation, PAD 106 may transmit a Special Needs data packet indicating the visual impairment, the extent of the impairment, and personal preferences. Assistance device 104 receives the Special Needs data packet and provides audio feedback to the PAD indicating the current floor on which the elevator is located and whether the elevator doors are opening or closing. The PAD then may present the audio feedback to the person via output device 108. The personal preferences may indicate a native language of the person and the assistance device may provide the feedback in the native language of the visually impaired person.

In accordance with a further embodiment of the present invention, assistance device 104 may request a response from the person. For example, considering a mobility-impaired person entering or exiting an elevator, assistance device 104 may request that the person respond when clear of the elevator doors. In such an example, the feedback will instruct the person to press a button or a portion of a touch screen on PAD 106 when clear of the doors. When the person has safely entered or exited the elevator doors, the person may initiate the response and the assistance device may instruct device 110 to close the doors.

As a further example, if a personalized accessibility device is within communication range with the assistance device for an extended period of time without activity, the assistance device may request a response to ensure that the person is well. If a response is not received, the assistance device may instruct an external system to dispatch personnel to investigate the situation.

FIG. 1 demonstrates the arrangement of the assistance device and personalized accessibility device in relation to an elevator controller. However, the assistance device and personalized accessibility device may be used in any situation in which a person may provide information to or receive feedback from a device. For example, the present invention may be configured so that a visually impaired person approaching an intersection receives feedback indicating the status of a pedestrian crossing signal. In this example, an assistance device may also instruct the pedestrian crossing signal to extend the time during which a pedestrian may safely cross the street. The assistance device may also provide feedback identifying the streets at the intersection.

Figure 2:
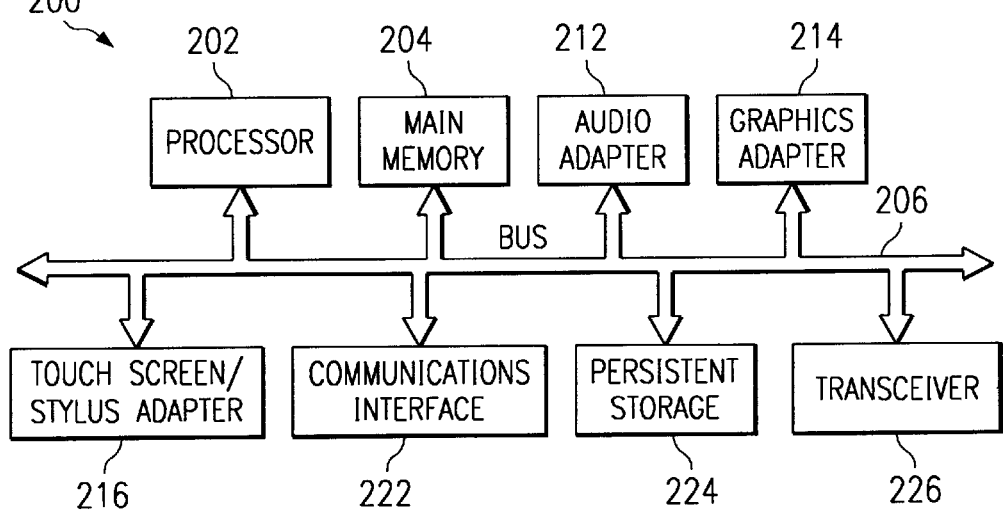
FIG. 2 is a block diagram of a personalized accessibility device in accordance with a preferred embodiment of the present invention.

With reference now to FIG. 2, a block diagram of a personalized accessibility device is shown in accordance with a preferred embodiment of the present invention. Device 200 is an example of a personalized accessibility device, such as personalized accessibility device 106 in FIG. 1, in which code or instructions implementing the processes of the present invention may be located. Device 200 employs bus architecture. The depicted example may employ a bus 206. Processor 202 and main memory 204 are connected to bus 206. Audio adapter 212, graphics adapter 214, and touch screen/stylus adapter 216 are connected to bus 206. Audio adapter 212 provides an interface to an audio device, such as headphones or an earphone. For example, headphones 108 in FIG. 1 may be connected to audio adapter 212. Graphics adapter 214 provides an interface to a graphics device, such as a liquid crystal display or active matrix display. The audio device and/or graphics device may be used to provide feedback to the user. Personalized accessibility device 200 may also include a communications interface 222. The communications interface may be a known communications interface, such as a modem or serial port. The bus provides a connection for persistent storage 224.

An operating system runs on processor 202 and is used to coordinate and provide control of various components within device 200 in FIG. 2. The operating system may be a commercially available operating system such as Windows CE™, which is available from Microsoft Corporation, or Palm OS™, which is available from Palm Computing. Instructions for the operating system and applications or programs are located on storage devices, such as persistent storage 224, and may be loaded into main memory 204 for execution by processor 202.

Transceiver 226 receives assistance data packets form assistance devices and transmits the Special Needs data packet. When an assistance device responds with feedback, the transceiver receives the feedback for subsequent presentation. The transceiver is a wireless communication device, such as an RF transmitter/receiver or Bluetooth device. Bluetooth is a wireless personal area network (PAN) technology from the Bluetooth Special Interest Group founded by Ericsson, IBM, Intel, Nokia and Toshiba. Bluetooth is an open standard for short-range transmission of digital voice and data between mobile devices, such as laptops, personal digital assistant (PDA) devices, and phones, and desktop devices. It supports point-to-point and multipoint applications.

Transceiver 226 may also be used to communicate with a docking station or personal computer to receive software and content updates. In an alternative embodiment, personalized accessibility device 200 may receive updates in a similar manner using other communication means, such as communications interface 222.

Personalized accessibility device 200 is shown to include touch screen/stylus adapter 216. However, other input device adapters may be used in place of or in addition to adapter 216. For example, device 200 may include a keypad or a microphone for voice command input.

Those of ordinary skill in the art will appreciate that hardware in FIG. 2 may vary depending on the implementation. The personalized accessibility device may include more or fewer features as the case may be. Other internal hardware or peripheral devices, such as flash ROM (or equivalent nonvolatile memory) or hard disk drives and the like, may be used in addition to or in place of the hardware depicted in FIG. 2.

For example, personalized accessibility device 200 may be a personal digital assistant (PDA), which is configured with ROM and/or flash ROM to provide non-volatile memory for storing operating system files and/or user-generated data. PAD 200 also may be a notebook computer, hand held computer, or telephony device in addition to taking the form of a PDA. The processes of the present invention are performed by processor 202 using computer implemented instructions, which may be located in a memory such as, for example, main memory 204 or persistent storage 224. As a further example, the personalized accessibility device may comprise components specifically designed and/or combined to carry out the functions of the present invention.

Figure 3:
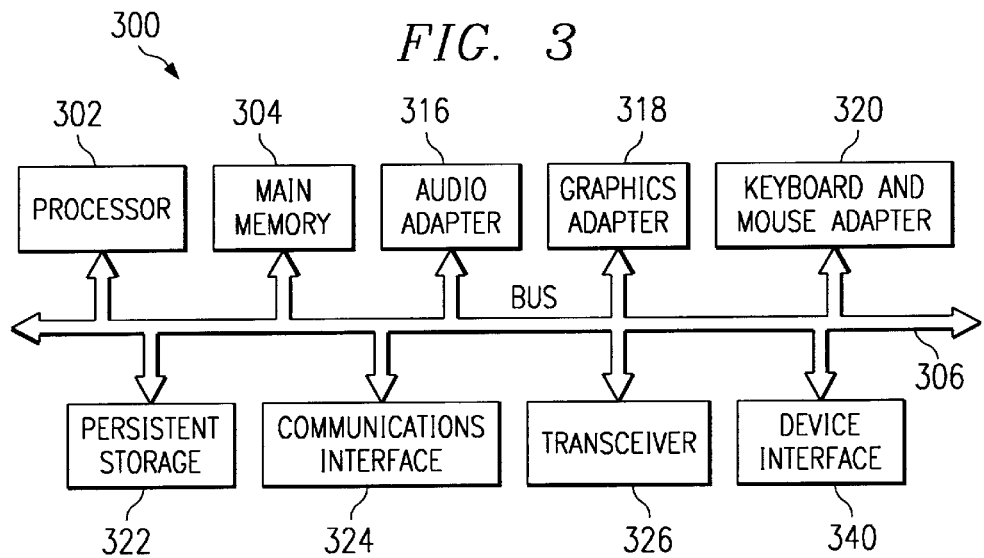
FIG. 3 is a block diagram illustrating an assistance device in accordance with a preferred embodiment of the present invention.

With reference now to FIG. 3, a block diagram illustrating an assistance device is shown in accordance with a preferred embodiment of the present invention. Assistance device 300 is an example of an assistance device, such as device 104 in FIG. 1. Device 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to bus 306. Audio adapter 316 and graphics adapter 318 are connected to bus 306. The bus also provides a connection for a keyboard and mouse adapter 320, persistent storage 322, and communications interface 324. The communications interface may be a known communications interface, such as a modem or local area network adapter.

An operating system runs on processor 302 and is used to coordinate and provide control of various components within assistance device 300 in FIG. 3. The operating system may be a commercially available operating system, such as Windows 2000™, which is available from Microsoft Corporation. An object oriented programming system such as Java™ may run in conjunction with the operating system and provides calls to the operating system from Java programs or applications executing on device 300. Instructions for the operating system, the object-oriented programming system, and applications or programs are located on storage devices, such as persistent storage 322, and may be loaded into main memory 304 for execution by processor 302.

Transceiver 326 transmits an assistance data packet and, thereafter, receives the Special Needs data packet. When the assistance device responds with feedback, the transceiver transmits the feedback for subsequent presentation by the personalized accessibility device. The transceiver is a wireless communication device, such as an RF transmitter/receiver or Bluetooth device. Transceiver 326 may also include means for measuring signal strength, as known in the art, for determining relative distance of a PAD. This information may be used to configure feedback. For example, an assistance device may determine whether a person is walking toward or away from a pedestrian crossing signal and configure feedback accordingly.

Transceiver 326 may also be used to communicate with a notebook computer or other device to receive software and content updates. In an alternative embodiment, assistance device 300 may receive updates in a similar manner using other communication means, such as communication interface 324. The assistance device may also communicate with external systems to perform other functions, such as upload of data and statistics, initiating dispatch of emergency personnel, and communication with other assistance devices. For example, an assistance device connected to a pedestrian crossing signal may communicate with an assistance device connected to a pedestrian crossing signal on the other side of the street. Signal strength measurement may also be used to monitor the pedestrian crossing the street. Thus, the person may be "handed off" to the assistance device associated with the pedestrian crossing signal on the other side of the street as the person approaches that assistance device.

The assistance device also includes a device interface 340 for communicating with a device, such as controller 110 in FIG. 1. The device interface 340 may be a proprietary interface or a standard communications port, such as a parallel port or serial port. In an alternative embodiment, the assistance device may communicate with a device using communications interface 324 or transceiver 326.

Those of ordinary skill in the art will appreciate that the hardware in FIG. 3 may vary depending on the implementation. Other internal hardware or peripheral devices, such as flash ROM (or equivalent nonvolatile memory) or hard disk drives and the like, may be used in addition to or in place of the hardware depicted in FIG. 3.

The depicted example in FIG. 3 and above-described examples are not meant to imply architectural limitations. For example, assistance device 300 also may be an integral component of the device for which it is providing assistance, such as an elevator controller or fire alarm system. As a further example, the assistance device may comprise components specifically designed and/or combined to carry out the functions of the present invention.

Figure 4A:
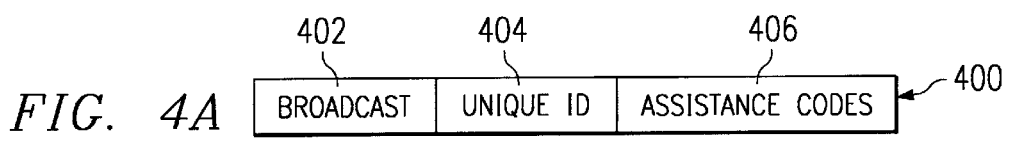
FIGS. 4A, 4B, 4C, and 4D are block diagrams of messages transmitted between an assistance device and a personalized accessibility device in accordance with a preferred embodiment of the present invention.

With reference now to FIGS. 4A, 4B, 4C, and 4D, block diagrams are shown of messages transmitted between an assistance device and a personalized accessibility device in accordance with a preferred embodiment of the present invention. Particularly, FIG. 4A illustrates a block diagram of an assistance data packet 400, which is broadcast by an assistance device. The assistance data packet includes a recipient device identification (ID) that indicates that it is a broadcast 402 and a unique device ID 404 that identifies the assistance device to personalized accessibility devices in receipt of the signal. The assistance data packet also includes assistance codes 406 that identify the assistance provided by the assistance device. The assistance code may be, for example, a 16-bit code. These codes may be predefined by assistance organizations for uniformity.

Figure 4B:
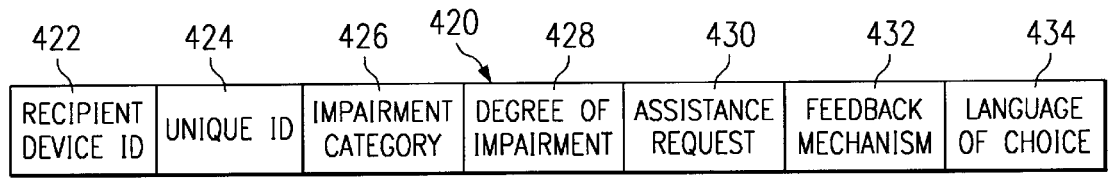

Turning now to FIG. 4B, a special needs data packet 420 is shown in accordance with a preferred embodiment of the present invention. The special needs data packet is a response by a personalized accessibility device to an assistance data packet 400 if the assistance codes 406 identify a type of assistance which is needed. If a type of assistance in assistance codes 406 is not needed, the assistance data packet is ignored by the PAD. The special needs data packet includes a recipient device ID 422, which identifies the assistance device to which the personalized accessibility device is responding, and a unique ID 424, which identifies the personalized accessibility device. The special needs data packet also includes an impairment category 426 and a degree of impairment 428. The impairment category and degree of impairment may be used by the assistance device to determine the type of assistance to provide or to customize feedback. The degree of impairment may be normalized to a numerical range, such as 1–100.

The special needs data packet also includes an assistance request 430. An assistance device may provide several forms of assistance. For example, an elevator may hold a door open for a mobility impaired person and provide audible feedback, such as whether the door is open or the current floor, for a sight impaired person. The assistance request 430 specifies the type of assistance requested for the person. The assistance request 430 may be one of the assistance codes 404 in the assistance data packet.

An assistance device may also decide not to provide assistance to the impaired person. For example, remaining with the elevator example, if the elevator device determines that the elevator is full, using a weight sensor or determining whether many floor buttons are pressed, an elevator device may not hold a door open longer for a mobility impaired person. It may be more convenient for the mobility impaired person to wait for the next elevator. This decision may be communicated to the impaired person.

Special needs data packet 420 also includes an indication of a feedback mechanism 432 and a language of choice 434. The feedback mechanism may be an output mechanism, such as spoken audio, text, graphical icons, vibration patterns, and Braille output. The assistance device may customize feedback according to the feedback mechanism and the language of choice of the person.

Figure 4C:
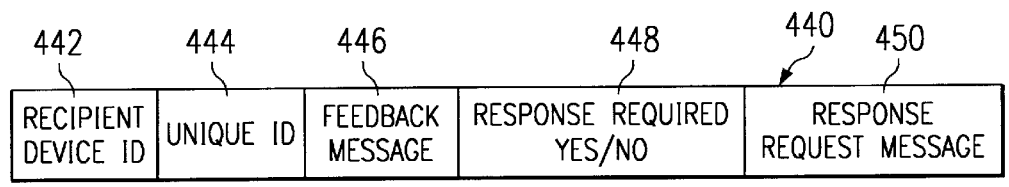

Turning next to FIG. 4C, a feedback data packet is shown in accordance with a preferred embodiment of the present invention. Feedback data packet 440 includes a recipient device ID 442, which identifies the personalized accessibility device to which the assistance device is providing feedback, a unique device ID 444, and a feedback message 446, which may comprise audio information, text information, or any other feedback information that corresponds to the feedback mechanism of the personalized accessibility device.

The feedback data packet 440 may also include an indication of whether a response to the feedback is requested 448. Thus, the feedback data packet may optionally include a response request message 450. For example, if a mobility impaired person has a high degree of impairment, an elevator device may hold the doors open until the mobility impaired person presses a button on the personalized accessibility device to indicate that it is safe to close the doors. In this example, the feedback message may state for example, "doors open," the response requested field would indicate, "yes," and the response request message may state for example, "press button when safely inside elevator." The response request message may also include an indication of an expected response, such as "go."

Figure 4D:
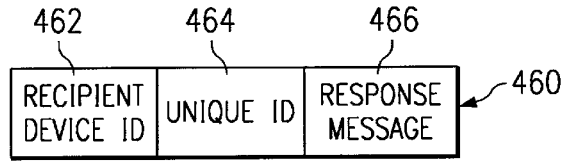

Next, turning to FIG. 4D, a response message data packet 460 is shown in accordance with a preferred embodiment of the present invention. Response message data packet 460 may include a recipient device ID 462, which identifies the assistance device to which the personalized assistance device is responding, a unique device ID 464, and a response message 466. The response message may be a typical acknowledgment signal indicating that a feedback data packet has been received. Also, in response to a feedback data packet that requests a response, the response message may include the requested response. In the above example of a mobility impaired person pressing a button when safely inside the elevator, the personalized accessibility device may generate the expected response, for example "go," in response to the user pressing the button.

With reference now to FIGS. 5A, 5B, 5C, and 5D, data flow diagrams are shown illustrating exemplary implementations of the present invention. Particularly, with respect to FIG. 5A, an example is shown in which the assistance device is an elevator device and the personalized accessibility device is personalized for a blind person. The data flows between the assistance device and the personalized accessibility device as described in the following steps:

502. The assistance device broadcasts an assistance data packet, which includes a device ID and assistance codes, which indicate the types of assistance provided by the assistance device.

504. Since the impaired person needs the assistance advertised by the assistance data packet, the personalized accessibility device responds to the assistance data packet with a special needs data packet. The special needs data packet addresses the assistance device to which it is responding and includes a device ID for the PAD. The impairment category indicates "sight" and the degree of impairment is "100," indicating that the person is blind. The special needs data packet also requests assistance in the form of event announcement. Also, the special needs data packet requests audio feedback and English as the language of choice.

506. The assistance device generates and transmits a feedback data packet including a "doors closing" message and indicating that no response to the feedback is requested.

508. The PAD presents the feedback to the user as audio information in English.

510. The PAD transmits an acknowledgment response message data packet to indicate that the feedback data packet was received.

512. The AD generates and transmits a feedback data packet including a "second floor" message and indicating that no response to the feedback is requested.

514. The PAD presents the feedback to the user as audio information in English.

516. The PAD transmits an acknowledgment response message data packet to indicate that the feedback data packet was received.

518. The AD generates and transmits a feedback data packet including a "door opening" message and indicating that no response to the feedback is requested.

520. The PAD presents the feedback to the user as audio information in English.

522. The PAD transmits an acknowledgment response message data packet to indicate that the feedback data packet was received. In this example, the person exits the elevator at the second floor and walks away from the elevator.

524. The AD generates and transmits a feedback data packet including a "door closing" message and indicating that no response to the feedback is requested. Since the impaired person has walked out of range of the AD, the feedback data packet is not received by the PAD. Therefore, the AD does not receive an acknowledgment response data packet and ends communication with the PAD.

Turning now to FIG. 5B, an example is shown in which the assistance device is a pedestrian crossing signal and the personalized accessibility device is personalized for a mobility impaired person. The data flows between the assistance device and the personalized accessibility device as described in the following steps:

532. The assistance device broadcasts an assistance data packet, which includes a device ID and assistance codes, which indicate the types of assistance provided by the assistance device.

534. Since the impaired person needs the assistance advertised by the assistance data packet, the personalized accessibility device responds to the assistance data packet with a special needs data packet. The special needs data packet addresses the assistance device to which it is responding and includes a device ID for the PAD. The impairment category indicates "mobility" and the degree of impairment is "50," indicating that the person may have difficulty moving in everyday situations. The special needs data packet also requests assistance in the form of crossing assistance. The assistance is indicated as required. Also, the special needs data packet requests audio feedback and English as the language of choice.

536. The assistance device generates and transmits a feedback data packet including a "cross now" message and indicating that no response to the feedback is requested.

538. The PAD presents the feedback to the user as audio information in English.

540. The PAD transmits an acknowledgment response message data packet to indicate that the feedback data packet was received.

542. The AD generates and transmits a feedback data packet including a "five seconds" message, thus beginning a countdown of the remaining time during which it will be safe to cross the street. The feedback data packet indicates that a response to the feedback is requested. The response request message is "press button for more time" and includes an expression of the expected response.

544. The PAD presents the feedback to the user as audio information in English.

546. The PAD transmits an acknowledgment response message data packet to indicate that the feedback data packet was received.

548. The AD generates and transmits a feedback data packet including a "four seconds" message, thus continuing the countdown of the remaining time during which it will be safe to cross the street. The feedback data packet indicates that a response to the feedback is requested. The response request message is "press button for more time" and includes an expression of the expected response.

550. The PAD presents the feedback to the user as audio information in English.

552. The mobility impaired person presses the button on the PAD to request more time. In response, the PAD transmits a response message data packet including the requested response.

554. The AD restarts the countdown and generates and transmits a feedback data packet including a "four seconds" message, thus continuing the countdown of the remaining time during which it will be safe to cross the street. The feedback data packet indicates that a response to the feedback is requested. The response request message is "press button for more time" and includes an expression of the expected response. The data flow continues in this manner until the PAD is out of range.

Figure 5A:
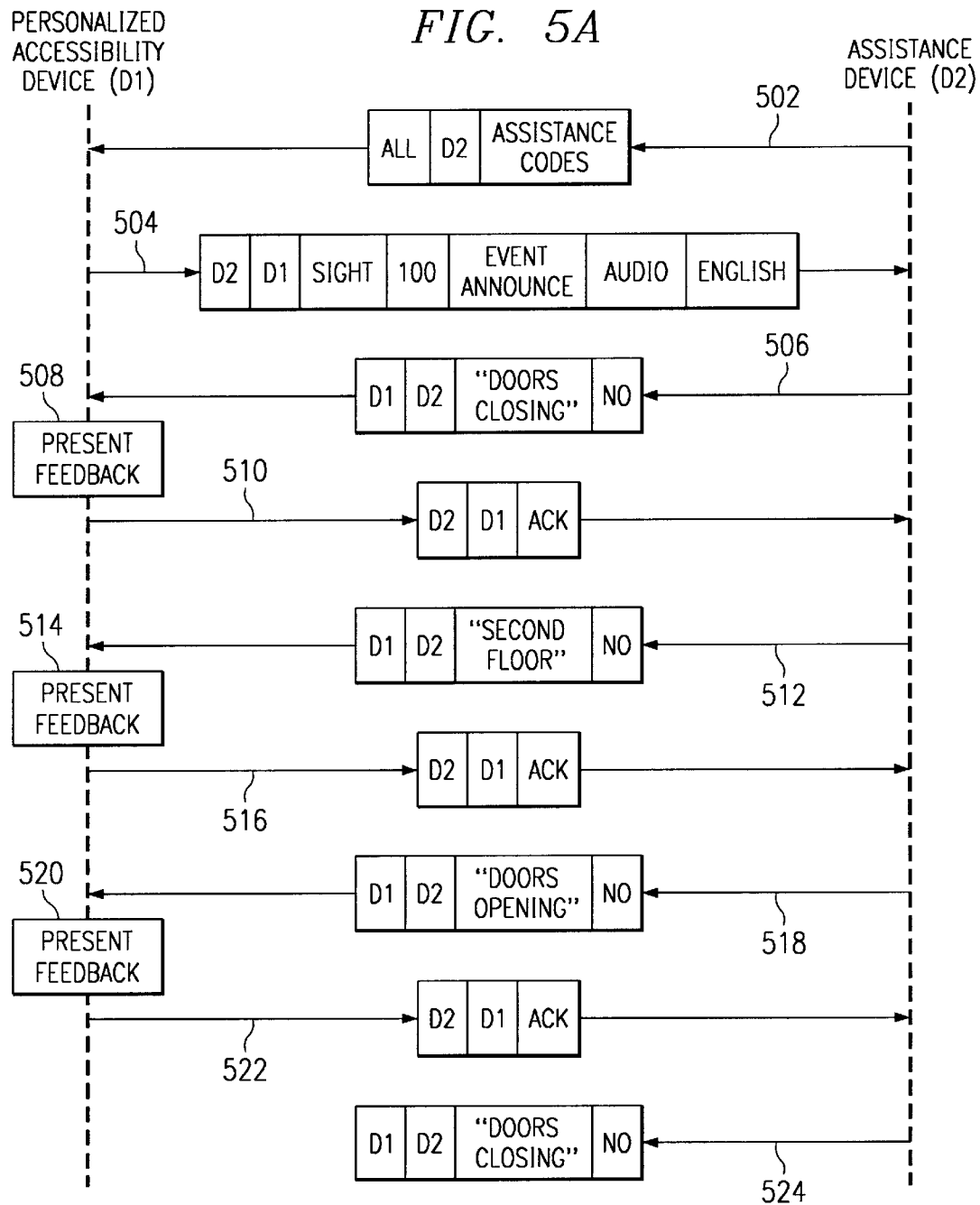
Figure 5C:
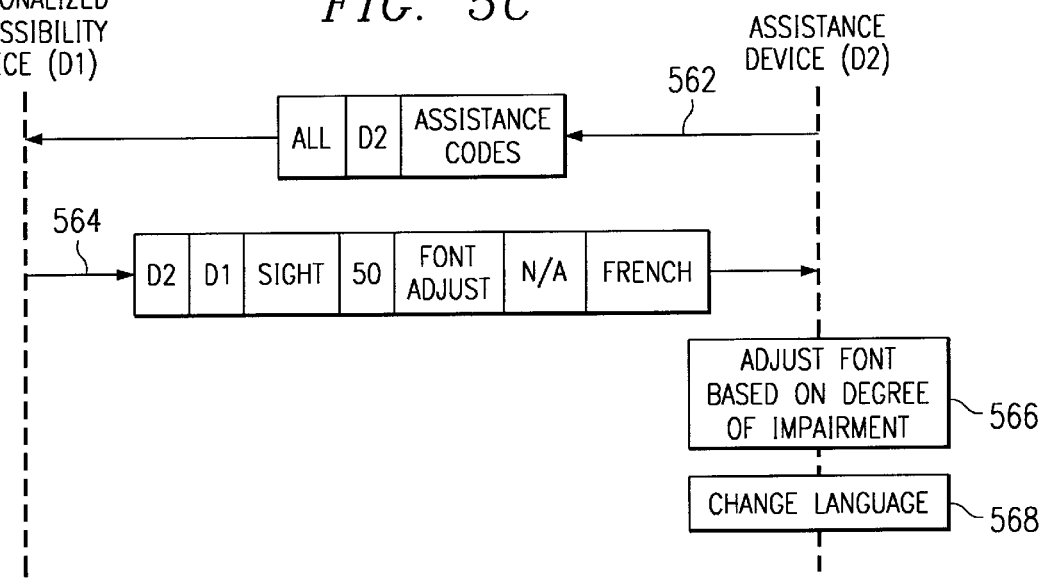

Next, turning to FIG. 5C, an example is shown in which the assistance device is a kiosk device and the personalized accessibility device is personalized for a sight impaired person. The data flows between the assistance device and the personalized accessibility device as described in the following steps:

562. The assistance device broadcasts an assistance data packet, which includes a device ID and assistance codes, which indicate the types of assistance provided by the assistance device.

564. Since the impaired person needs the assistance advertised by the assistance data packet, the personalized accessibility device responds to the assistance data packet with a special needs data packet. The special needs data packet addresses the assistance device to which it is responding and includes a device ID for the PAD. The impairment category indicates "sight" and the degree of impairment is "50," indicating that the person may have difficulty reading a display. The special needs data packet also requests assistance in the form of font adjustment. The assistance is indicated as required. Also, the special needs data packet indicates that feedback mechanism is not applicable (N/A) and that the language of choice is French.

566. The AD adjusts the font of information displayed on the kiosk based on the degree of impairment.

568. The AD changes the language of text displayed on the kiosk based on the language of choice.

Figure 5D:
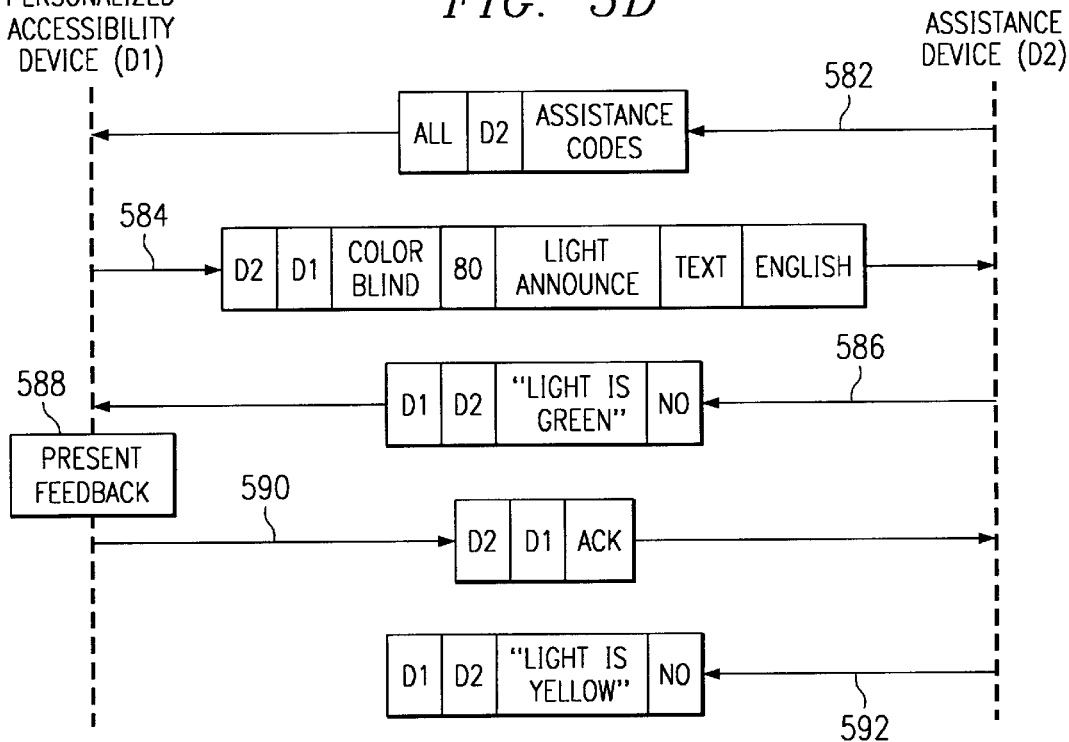

Turning next to FIG. 5D, an example is shown in which the assistance device is a traffic light device and the personalized accessibility device is personalized for a color blind person. The PAD may be installed in the dashboard of an automobile with the transceiver on the front of the automobile. The AD may be installed in an overhead traffic light fixture with the transceiver using a directional transmission, such as infrared signals, such that only approaching automobiles will receive assistance data packets and feedback data packets. The data flows between the assistance device and the personalized accessibility device as described in the following steps:

582. The assistance device broadcasts an assistance data packet, which includes a device ID and assistance codes, which indicate the types of assistance provided by the assistance device.

584. Since the impaired person needs the assistance advertised by the assistance data packet, the personalized accessibility device responds to the assistance data packet with a special needs data packet. The special needs data packet addresses the assistance device to which it is responding and includes a device ID for the PAD. The impairment category indicates "color blind" and the degree of impairment is "80," indicating that the person has great difficulty seeing colors, thus relying on the positioning of the lights and the flow of traffic to determine the state of the traffic light. The special needs data packet also requests assistance in the form of light announcement. The assistance is indicated as not required. Also, the special needs data packet requests text feedback and English as the language of choice. Alternatively, audio feedback through a radio speaker or earphone may be provided.

586. The assistance device generates and transmits a feedback data packet including a "light is green" message and indicating that no response to the feedback is requested.

588. The PAD presents the feedback to the user as text information in English. The feedback may be presented on a display in or attached to the dashboard of the automobile or on a heads-up display in the windshield.

590. The PAD transmits an acknowledgment response message data packet to indicate that the feedback data packet was received.

592. The AD generates and transmits a feedback data packet including a "light is yellow" message and indicating that no response to the feedback is requested. Since the impaired person has driven out of range of the AD, the feedback data packet is not received by the PAD. Therefore, the AD does not receive an acknowledgment response data packet and ends communication with the PAD.

Figure 6:
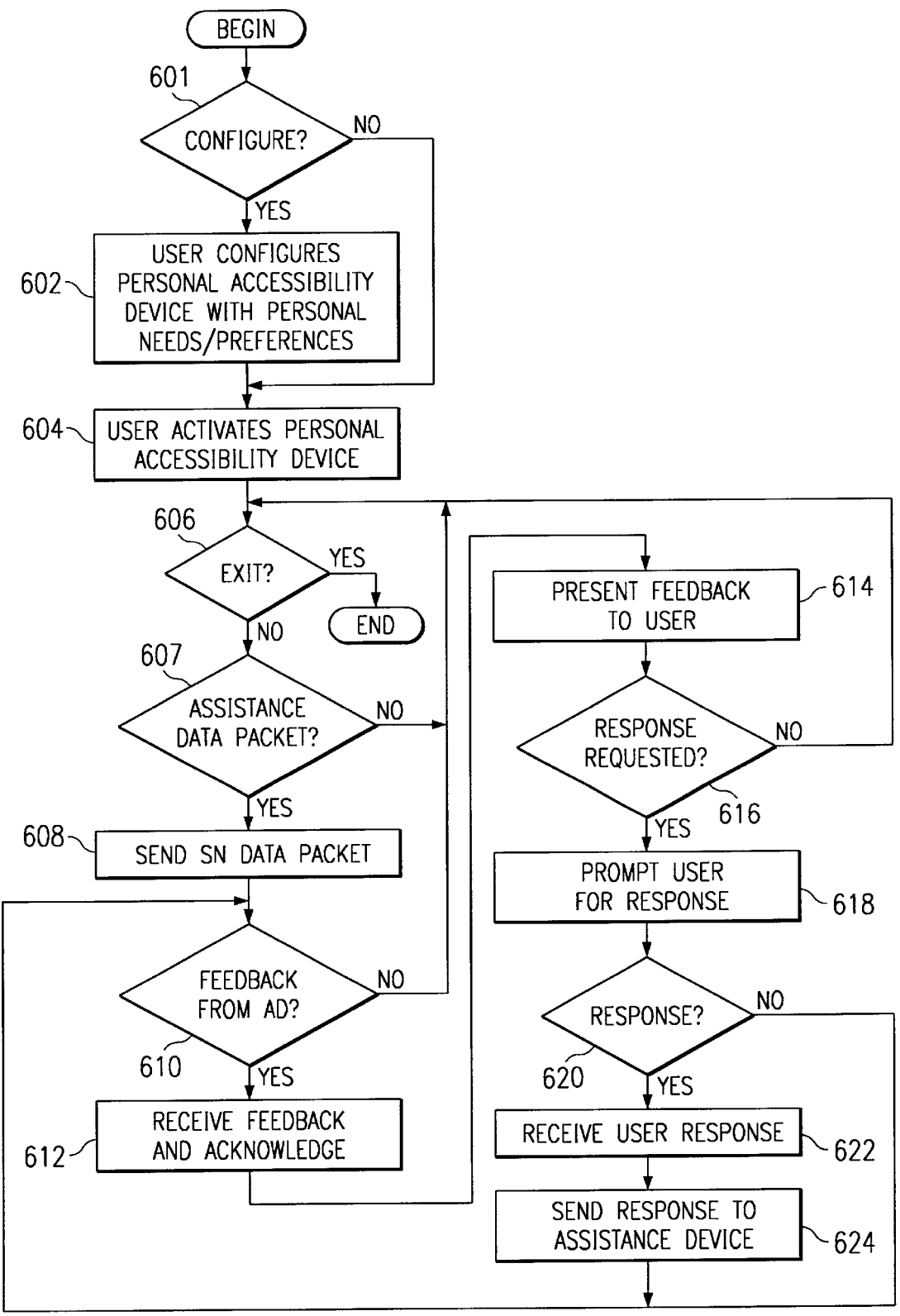
FIG. 6 is a flowchart illustrating the operation of a personalized accessibility device in accordance with a preferred embodiment of the present invention.

With reference to FIG. 6, a flowchart is shown illustrating the operation of a personalized accessibility device in accordance with a preferred embodiment of the present invention. The process begins and a determination is made as to whether the personalized accessibility device is to be configured (step 601). If the personalized accessibility device is to be configured, the user configures the personalized accessibility device with Special Needs information and preferences (step 602). Responsive to a determination that the personalized accessibility device is not to be configured in step 601 or upon completion of the configuration in step 602 the user activates the PAD (step 604) and a determination is made as to whether an exit condition exists (step 606). An exit condition exists when the device is turned off or when the device is in an inactive mode, such as during configuration, or is reset by the user. If an exit condition exists, the process ends.

If an exit condition does not exist in step 606, a determination is made as to whether an assistance data packet is received from an assistance device (step 607). If an assistance data packet is not received, the process returns to step 606 to determine whether an exit condition exists and loops until an assistance packet is received or an exit condition exists. If an assistance data packet is received in step 607, the process sends a Special Needs (SN) data packet (step 608) and a determination is made as to whether feedback from an assistance device (AD) is detected (step 610). If feedback is not detected, the process returns to step 606 to determine whether an exit condition exists.

If feedback is detected in step 610, the process receives the feedback (step 612) and presents the feedback to the user (step 614). Then, a determination is made as to whether a response to the feedback is requested (step 616). If a response is not requested, the process returns to step 606 to determine whether an exit condition exists.

If a response is requested in step 616, the process prompts the user for the response (step 618) and a determination is made as to whether a response is initiated from the user (step 620). If a response is not initiated from the user in a predetermined time period, the process returns to step 610 to determine whether feedback is detected from the assistance device. The assistance device may provide the feedback and request a response several times depending on the situation.

If a response is initiated from the user in step 620, the process receives the user response (step 622), sends the response to the assistance device (step 624) and returns to step 610 to determine whether feedback is detected from the assistance device.

Figure 7:
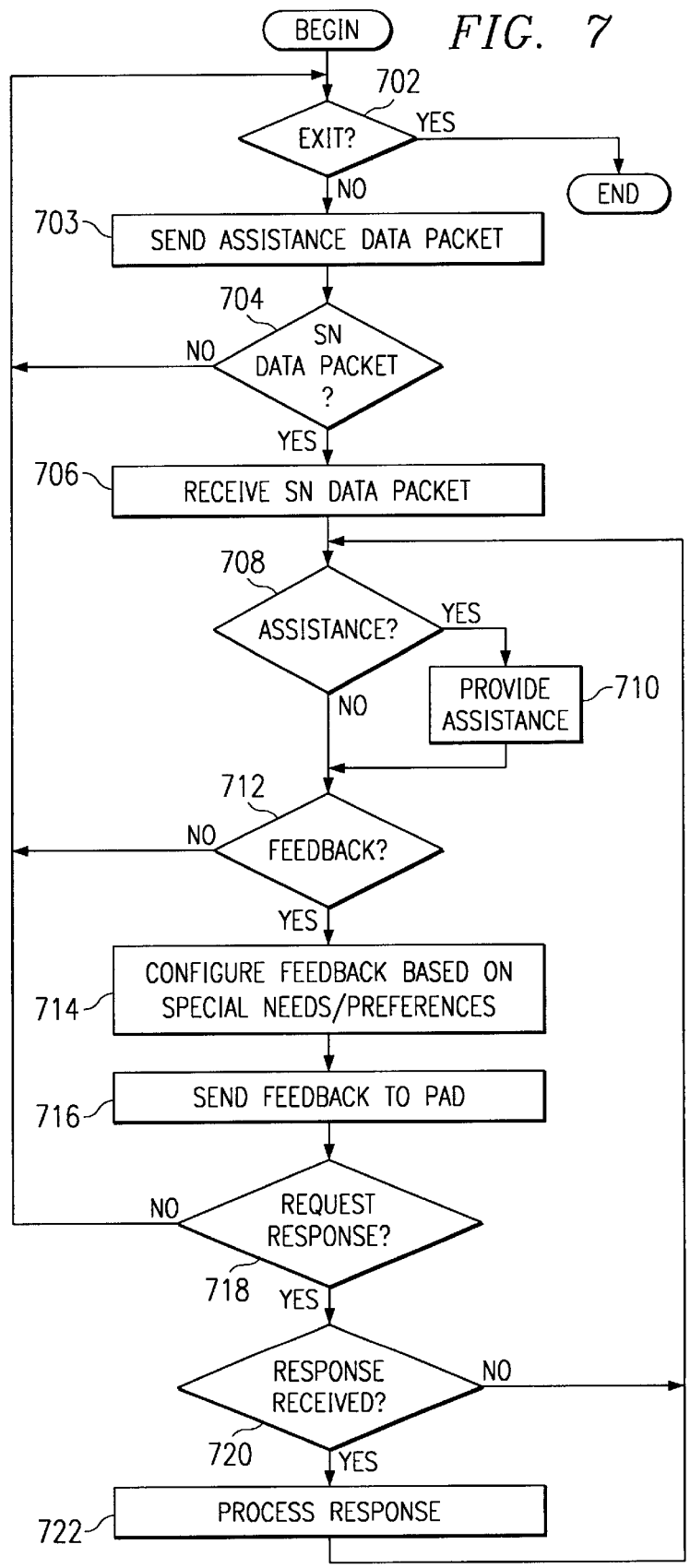
FIG. 7 is a flowchart illustrating the operation of an assistance device in accordance with a preferred embodiment of the present invention.

Turning now to FIG. 7, a flowchart illustrating the operation of an assistance device is depicted in accordance with a preferred embodiment of the present invention. The process begins and a determination is made as to whether an exit condition exists (step 702). An exit condition exists when the device is turned off or when the device is in an inactive mode, such as during configuration. If an exit condition exists, the process ends.

If an exit condition does not exist in step 702, the process broadcasts an assistance data packet (step 703) and a determination is made as to whether a Special Needs data packet is detected (step 704). If a Special Needs data packet is not detected, the process returns to step 702 to determine whether an exit condition exists. If a Special Needs data packet is detected in step 704, the process receives the Special Needs data packet (step 706) and a determination is made as to whether assistance is requested (step 708). If assistance is requested, the process provides the assistance (step 710) and a determination is made as to whether feedback is requested (step 712). If assistance is not requested in step 708, the process proceeds directly to step 712 to determine whether feedback is requested.

If feedback is not requested, the process returns to step 702 to determine whether an exit condition exists. If feedback is requested in step 712, the process configures the feedback based on the Special Needs information and personal preferences in the Special Needs data packet (step 714). Then, the process sends the feedback to the PAD (step 716) and a determination is made as to whether the feedback includes a response request (step 718). If the feedback does not include a response request, the process returns to step 702 to determine whether an exit condition exists.

If the feedback does include a response request in step 718, a determination is made as to whether a response is received from the PAD (step 720). If a response is not received within a predetermined time period, the process returns to step 708 to determine whether further assistance is requested. If a response is received in step 720, the response is processed (step 722) and control returns to step 708 to determine whether further assistance is requested.

Thus, the present invention provides a method and apparatus for providing assistance to disabled persons. Assistance devices broadcast assistance data packets advertising types of assistance provided. A personalized accessibility device communicates an identification of a disability or impairment to an assistance device, which provides the assistance. For example, an assistance device may instruct an automatically revolving door to decrease the rotation rate for a person with mobility impairment. The present invention also provides a method and apparatus for providing feedback to a person with impairment. For example, an assistance device may provide feedback warning a person with a pacemaker of close proximity to a microwave oven. The assistance device may provide feedback to a person with an oxygen tank, the feedback providing a warning of close proximity to an open flame. Still further, the feedback may be configured based on the type and extent of impairment, as well as personal preferences, such as a native or preferred language. The assistance device may also request a response from the disabled or impaired person, thus solving the person's Special Needs in a conversational manner. The present invention provides all of these advantages without calling attention to the impairment.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:

receiving an assistance data packet indicating assistance offered by the assistance device; and responsive to the assistance offered by the assistance device being a needed type of assistance, sending special needs information to the assistance device, wherein the special needs information includes impairment data indicating an impairment category of a person and an assistance request.

2. The method of claim 1, wherein the special needs information includes impairment extent information indicating the extent of the impairment.

3. The method of claim 1, wherein the special needs information includes personal preference information indicating preferences of the person for dealing with the impairment.

4. The method of claim 3, wherein the preference information includes a language and wherein the method farther comprises presenting feedback information in the language.

5. The method of claim 1, further comprising:

receiving feedback information from the assistance device; and presenting the feedback information to the person.

6. The method of claim 5, wherein the feedback information is audio information and the step of presenting the feedback information comprises playing the feedback information using an audio output device.

7. The method of claim 5, wherein the step of presenting the feedback information comprises displaying the feedback information using a display device.

8. The method of claim 5, wherein the feedback information includes a request for a response from the person.

9. The method of claim 8, further comprising:

receiving a response from the person; and sending the response to the assistance device.

10. A method comprising:

broadcasting an assistance data packet indicating assistance offered by the assistance device;

receiving special needs information from a personalized accessibility device, wherein the special needs information includes impairment data indicating an impairment category of a person and a request for assistance; and providing assistance based on the special needs information.

11. The method of claim 10, wherein the special needs information includes impairment extent information indicating an extent of the impairment.

12. The method of claim 10, further comprising sending a request for a response from the person.

13. The method of claim 12, further comprising:

receiving a response from the personalized accessibility device; and processing the response.

14. The method of claim 13, wherein die step of processing the response comprises determining whether further assistance is needed.

15. The method of claim 13, wherein the step of processing the response comprises dispatching emergency personnel if a predetermined number of requests for a response have sent without an appropriate response.

16. A method comprising:

receiving special needs information from a personalized accessibility device, wherein the special needs information includes impairment data indicating an impairment category of a person;

configuring feedback information based on the special needs information; and sending the feedback information to the personalized accessibility device.

17. The method of claim 16, wherein the special needs information includes personal preference information indicating preferences of the person for dealing with the impairment.

18. The method of claim 17, wherein the preference information includes a language and the step of configuring feedback information comprises configuring the feedback information in the language.

19. The method of claim 16, wherein the step of configuring feedback information comprises configuring audio information.

20. The method of claim wherein the feedback information includes a request for a response from the person.

21. The method of claim 20, further comprising:

receiving a response from the personalized accessibility device; and processing the response.

22. The method of claim 21, wherein the step of processing the response comprises determining whether further assistance is needed.

23. The method of wherein the step of processing the response comprises determining whether further feedback is needed.

24. The method of claim 21, wherein the step of processing the response comprises dispatching emergency personnel if a predetermined number of acknowledgment response signals are received without an appropriate response.

25. The method of claim 16, further comprising:

broadcasting an assistance data packet indicating assistance offered by the assistance device.

26. An apparatus comprising:

receiving means for receiving an assistance data packet indicating assistance offered by the assistance device; and sending means, responsive to the assistance offered by the assistance device being a needed type of assistance, for sending special needs information to the assistance device, wherein the special needs information includes impairment data indicating an impairment category of a person and an assistance request.

27. The aparatus of claim 26, wherein the special needs information includes impairment extent information indicating the extent of the impairment.

28. The apparatus of claim 26, wherein the special needs information includes personal preference information indicating preferences of the person for dealing with the impairment.

29. The apparatus of claim 28, wherein the preference information includes a language and wherein the apparatus further comprises means for presenting feedback information in the language.

30. The apparatus of claim 26, further comprising:

means for receiving feedback information from the assistance device; and means for presenting the feedback information to the person.

31. The apparatus of claim 30, wherein the feedback information includes a request for a response from the person.

32. The apparatus of claim 31, further comprising:
means for receiving a response from the person; and
means for sending the response to the assistance device.

33. An apparatus comprising:
broadcast means for broadcasting an assistance data packet indicating assistance offered by the assistance device;
receipt means for receiving special needs information from a personalized accessibility device, wherein the special needs information includes impairment data indicating an impairment category of a person and a request for the assistance; and
assistance means for providing assistance based on the special needs information.

34. The apparatus of claim 33, wherein the special needs information includes impairment extent information indicating an extent of the impairment.

35. The apparatus of claim 33, wherein the special needs information includes personal preference information indicating preferences of the person for dealing with the impairment.

36. The apparatus of claim 33, further comprising:
means for receiving a response from the personalized accessibility device; and
processing means for processing the response.

37. The apparatus of claim 36, wherein the processing means comprises means for determining whether further assistance is needed.

38. An apparatus comprising:
receipt means for receiving special needs information from a personalized accessibility device, wherein the special needs information includes impairment data indicating an impairment category of a person;
configuration means for configuring feedback information based on the special needs information; and
sending means for sending the feedback information to the personalized accessibility device.

39. The apparatus of claim 38, wherein the special needs information includes personal preference information indicating preferences of the person.

40. The apparatus of claim 39, wherein the preference information includes a language and the configuration means comprises means for configuring the feedback information in the language.

41. The apparatus of claim 38, wherein the feedback information includes a request for a response from the person.

42. The apparatus of claim 41, further comprising:
means for receiving a response from the personalized accessibility device; and
processing means for processing the response.

43. The apparatus of claim 42, wherein the processing means comprises means for determining whether farther assistance is needed.

44. The apparatus of claim 42, wherein the processing means comprises means for determining whether further feedback is needed.

45. A computer program product, in a computer readable medium, comprising:
instructions for receiving an assistance data packet indicating assistance offered by the assistance device; and
instructions, responsive to the assistance offered by the assistance device being a needed type of assistance, for sending special needs information to the assistance device, wherein the special needs information includes impairment data indicating an impairment category of a person and an assistance request.

46. A computer program product, in a computer readable medium, comprising:
instructions for broadcasting an assistance data packet indicating assistance offered by the assistance device;
instructions for receiving special needs information from a personalized accessibility device, wherein the special needs information includes impairment data indicating an impairment category of a person and a request for assistance; and
instructions for providing assistance based on the special needs information.

47. A computer program product, in a computer readable medium, comprising:
instructions for receiving special needs information from a personalized accessibility device, wherein the special needs information includes impairment data indicating an impairment category of a person;
instructions for configuring feedback information based on the special needs information; and
instructions for sending the feedback information to the personalized accessibility device.

* * * * *

UNITED STATES PATENT AND TRADEMARK OFFICE
CERTIFICATE OF CORRECTION

PATENT NO. : 6,828,918 B2 Page 1 of 1
DATED : December 7, 2004
INVENTOR(S) : Bowman et al.

It is certified that error appears in the above-identified patent and that said Letters Patent is hereby corrected as shown below:

<u>Title page</u>,
Item [74], *Attorney, Agent, or Firm*, delete "Jeffrey S. Labaw" and insert
-- Jeffrey S. LaBaw --.

<u>Column 13</u>,
Line 19, after "method" delete "farther" and insert -- further --.
Line 56, after "wherein" delete "die" and insert -- the --.

<u>Column 14</u>,
Line 18, after "claim" insert -- 16, --.
Line 27, after "method of" insert -- claim 21, --.

<u>Column 16</u>,
Line 9, after "whether" delete "farther" and insert -- further --.

Signed and Sealed this

Twenty-eighth Day of March, 2006

JON W. DUDAS
*Director of the United States Patent and Trademark Office*